Nov. 8, 1927.
W. E. GOBLE
1,648,341
BRUSH SHREDDING AND CUTTING MACHINE
Filed June 24, 1926
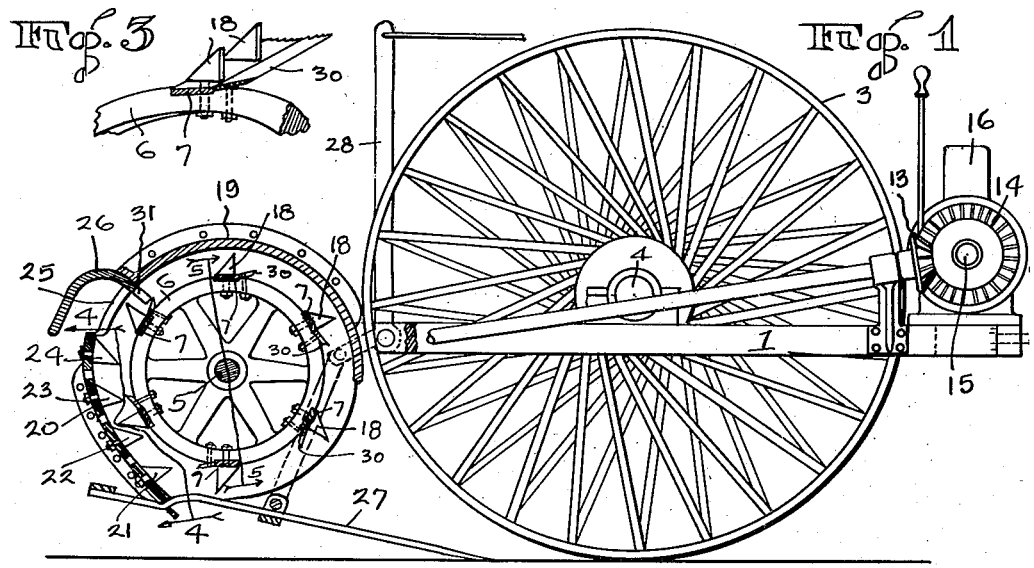
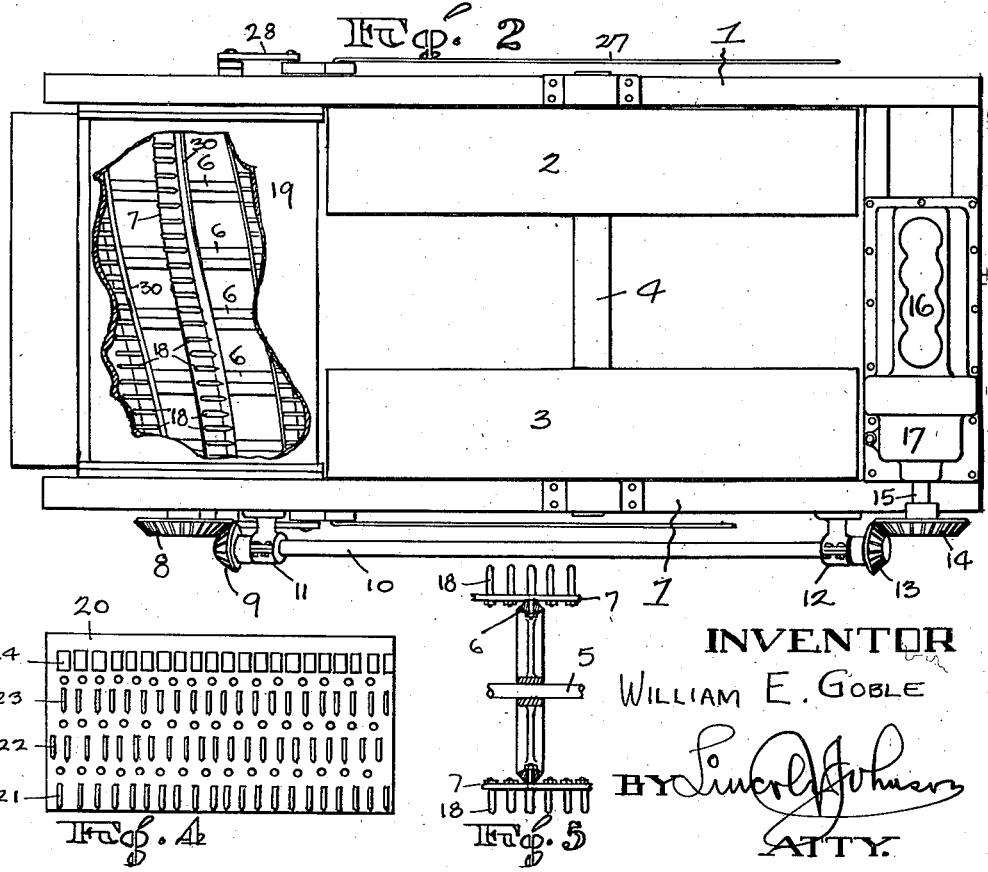
INVENTOR
WILLIAM E. GOBLE
BY
ATTY.

Patented Nov. 8, 1927.

1,648,341

UNITED STATES PATENT OFFICE.

WILLIAM E. GOBLE, OF OROSI, CALIFORNIA.

BRUSH SHREDDING AND CUTTING MACHINE.

Application filed June 24, 1926. Serial No. 118,220.

This invention relates particularly to a machine for shredding, cutting, macerating and pulverizing the brush, prunings and other material cut from trees, to convert the same into a fibrous aggregate.

An object of the invention is to provide a machine that may be moved between the rows of trees of an orchard to gather up and force discarded brush and prunings between shredding and macerating knives to break the same up into fine particles and to allow the shredded residue to drop back onto the ground in a condition in which it may be readily mixed with the soil as a fertilizer.

A further object of the invention is to provide a brush shredding and cutting machine that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 represents the side elevation of a machine constructed in accordance with my invention, partly broken away to show the interior construction thereof.

Fig. 2 is a plan view of Fig. 1.

Fig. 3 is a perspective view of a fragmentary portion of the brush cutting knives.

Fig. 4 is a view taken through Fig. 1 on the line 4—4.

Fig. 5 is a section taken through Fig. 1 on the line 5—5.

It is a customary practice in caring for fruit trees to trim or prune off superfluous brush, limbs and shoots and to throw the cut material between the rows of fruit trees where it may be easily picked up, carted away and burned. The brush and prunings, when cut from the tree, are usually in a green and tender condition, making it possible to easily macerate and shred the brush material into fine particles so that it may be spread, in a shredded condition, over the soil with which it may be mixed to act as a fertilizer.

In detail, the construction illustrated in the drawings comprises a frame 1, of a vehicle, having a pair of traction wheels 2 and 3 journaled on the opposite ends of a shaft 4, that is mounted on the frame 1. The vehicle 1 may be either of the trailer type or it may be an automotive vehicle capable of moving under its own power.

The rear end of the frame 1 is provided with a shaft 5 which has its opposite ends journaled thereon. The shaft 5 extends laterally across the frame 1 and has a plurality of wheels or drums 6 arranged at regularly spaced intervals thereon. All of the wheels 6 have their peripheries connected together by a plurality of transverse bars 7 arranged in spaced circumferential relation therearound. Each bar 7 is securely bolted to each one of the wheels 6, and all the bars 7 are arranged at a right angle to the path of revolution of each of the wheels 6. The periphery of each wheel 6 is substantially triangular in cross section, so that the apex thereof faces out. The wheels 6 when joined together by the bars 7 form a cylindrical or drum like member. An end of the shaft 5, on which the wheels 6 are mounted, extends out through the frame 1 and has a bevelled gear 8 secured thereon. A driving pinion 9 meshes with the gear 8, said pinion 9 being secured on a shaft 10 that is journaled in bearings 11 and 12 on the frame 1. The opposite end of the shaft 10 is provided with a bevelled pinion 13 thereon that meshes with a bevelled gear 14 that is fixed on the drive shaft 15 of an engine 16 that is mounted on the frame 1. The engine 16 is provided with a clutch (not shown) enclosed in a housing 17 thereon, by means of which the engine power may be connected and disconnected to the driving shaft 15 and related bevelled gears to drive the drum.

Each of the transverse bars 7 has a cutting knife 30 placed adjacent the forward edge thereof and extended transversely across the connected wheels 6. The forward edge of each knife 30 is raised above the triangular periphery of each wheel 6. The upper face of each of the transverse bars 7 has a plurality of upstanding, triangularly shaped cutting blades 18 thereon, that extend across the full length of the bar. Each cutting blade 18 has its upstanding forward edge slightly bevelled.

The entire upper half of the connected wheels 6 is enclosed by a curved housing 19. Around the rear of the connected wheels 6 I have arranged a curved plate 20 that is secured at its opposite ends to the opposite sides of the frame 1. The curve of the plate 20 is not concentric to the circumference of the wheels 6. The upper edge of the plate 20 is relatively close to the periphery of the wheels 6 while the lower edge of said plate is flared outwardly and away from the periphery of the wheels 6. The lower edge of the plate 20 is flared away from the wheels 6 to form a relatively large opening into which the brush and limbs are passed to be shredded. Adjacent the lower edge of and on the inside face of the plate 20, I have arranged a transverse row of triangularly shaped cutting blades 21, constructed similarly to the cutting members 18 on each of the transverse bars 7. A row of cutting blades 22 are arranged on the inside face of the curved plate 20 in spaced parallel relation to the lower row of blades 21. A third row of cutting blades 23 are arranged on the inside face of the plate 20 in spaced parallel relation to both the first and second mentioned rows of cutting blades. Along the upper edge of the plate 20 and on the inside face thereof, I have provided the fourth row of cutting blades 24, each of which are wider than the cutting members in either of the three rows heretofore mentioned and each of the cutting blades 24 are spaced closer together than the cutting members in the other rows. The individual cutting members 21, 22, 23 and 24 in each of the rows are spaced apart a sufficient distance to permit the cutting blades 18 on the wheels to be passed therethrough, and the cutting blades in each of the parallel rows are arranged in off-set or staggered relation relative to each other. An opening or port 25 is formed between the upper edge of the plate 20 and an edge of the housing 19, through which the brush trimmings that are shredded are adapted to be ejected. The gap 25 is enclosed by a covering 26 which tends to deflect the shredded material over the soil in the rear of the plate 20. An edge of the housing 26 extends within the inside face of the cover 19 and is serrated at 31, to permit the cutting blades 18 on the bars 7 to pass therethrough, but to clean or wipe off any of the shredded or macerated brush material that may have adhered to said cutting blades.

Along the under side of the plate 20, I have pivotally arranged a plurality of brush gathering teeth 27. The free ends of the teeth 27 are adapted to extend in the direction of movement of a vehicle and to lightly rest upon the soil upon which the vehicle moves. The rear end of the gathering teeth is provided with a lever 28 thereon, which is secured to the vehicle 1 and by means of which the position of the gathering teeth relative to the soil may be adjusted.

In the practice of operating my invention, the drum with the cutting blades 18 thereon is rotated at a speed ranging from 600 to 2000 revolutions per minute. As the vehicle is moved, the brush material is gathered up in the teeth 27 and guided into the outwardly flared lower edge of the plate 20. The revolving drum with the blades 18 thereon, forces the brush material up into the space between the periphery of the wheels 6 and the inside face of the plate 20. The cutting blades 18 are so arranged on the periphery of the wheel bars 7, and on the inside face of th plate 20 that no clear space remains through which the brush material can escape. The rotary speed of the cutting blades 18 is sufficient to force the brush material through and past the parallel rows of offset cutting members, (starting with the first row and passing successively through the second, third and fourth rows of stationary cutting blades,) until said brush material is thoroughly shredded and macerated and discharged out the port 25. The brush material is shredded, in part, before it reaches the port 20, and in order to throw out the initially shredded material, I have perforated the plate 20 between each of the rows of stationary butting blades. The perforations in the plate 20 are large enough to permit the discharge of shredded brush material of a selected size, but not large enough to permit the discharge of all brush material. In my experiments I have determined that sufficient power should be used to rotate the wheels 6 with the cutting blades 18 thereon, in order that all brush material, irrespective of its size and thickness, will be passed through the machine and thoroughly shredded without danger of causing the cutting blades to stop or to cause any injury or damage to the machine. The brush material is decidedly fibrous and stringy in its nature and for that reason easily shreds and breaks up into a finely comminuted mass after it has passed through the shredding teeth of my apparatus.

Having thus described this invention, what I now claim and desire to secure by Letters Patent is:

1. In a brush shredding machine, a rotary drum; radially extended blades arranged circumferentially on said drum; a plate on the machine arranged in eccentric spaced relation to the circumference of the drum, one edge of said plate being arranged closer to the drum than the opposite edge of said plate; plural rows of off-set blades arranged on said plate facing the blades on the drum; and means to feed brush to be shredded into the space between the drum and plate.

2. In a brush shredding machine, a frame; a drum rotatably mounted on said frame having cutting blades arranged around the periphery thereof; power means to rotate said drum; a plate on the frame related to a portion of the periphery of the drum and arranged in spaced relation thereto, one edge of said plate being arranged closer to the drum than the opposite edge of said plate; rows of independent cutting blades arranged in off-set relation on said plate to have the cutting blades on the drum pass therebetween; and means to feed brush to be shredded into the space between the drum and plate.

3. In a brush shredding machine, a rotary drum; radially extended blades arranged circumferentially on said drum; a plate on the machine arranged in eccentric spaced relation to the circumference of the drum, one edge of said plate being arranged closer to the drum than the opposite edge of said plate; plural rows of off-set blades arranged on said plate facing the blades on the drum; means to feed brush to be shredded into the space between the drum and plate; and means to strip the shredded brush from the blades on the drum.

4. In a brush shredding machine, a frame; a drum rotatably mounted on said frame having cutting blades arranged around the periphery thereof; power means to rotate said drum; a plate on the frame related to a portion of the periphery of the drum and arranged in spaced relation thereto, one edge of said plate being arranged closer to the drum than the opposite edge of said plate; rows of independent cutting blades arranged in offset relation on plate to have the cutting blades on the drum pass therebetween; means to feed brush to be shredded into the space between the drum and plate; and means to strip the shredded brush from the blades on the drum.

5. In a brush shredding machine, a horizontally disposed concave casing having an intake along the bottom thereof and a discharge along the upper side thereof; plural rows of blades arranged in off-set relation on the interior of the casing between the intake and discharge; a drum rotatably mounted in eccentric relation to the concave casing; radially extended blades arranged on the periphery of the drum to pass between the blades on the casing; means on the machine to rotate the drum; and means on the casing to feed brush to be shredded into the intake.

6. In a brush shredding machine, a horizontally disposed concave casing having an intake along the bottom thereof and a discharge along the upper side thereof; plural rows of blades arranged in off-set relation on the interior of the casing between the intake and discharge; a drum rotatably mounted in eccentric relation to the concave casing; radially extended blades arranged on the periphery of the drum to pass between the blades on the casing; means on the machine to rotate the drum; means on the casing to feed brush to be shredded into the intake; and means to strip shredded brush from the blades on the drum.

In testimony whereof, I have hereunto set my hand at San Francisco, California, this 8 day of May, 1926.

WILLIAM E. GOBLE.